United States Patent [19]

Kumar et al.

[11] 4,342,734

[45] Aug. 3, 1982

[54] METHOD FOR FORMING γ-BORON

[75] Inventors: Kaplesh Kumar, Wellesley; Dilip K. Das, Bedford, both of Mass.

[73] Assignee: The United States of America as represented by the Secretary of the Navy, Washington, D.C.

[21] Appl. No.: 284,848

[22] Filed: Jul. 20, 1981

[51] Int. Cl.³ ............................................. C01B 35/02
[52] U.S. Cl. .................................... 423/298; 204/164; 427/34
[58] Field of Search ..................... 423/298; 427/34; 204/164

[56] References Cited

PUBLICATIONS

Hoard J. L.; "Structure & Polymorphisar in Elemental Boron", Adv. in Chem., Series, No. 32; JACS; 1958, pp. 42–52.

*Primary Examiner*—G. O. Peters
*Attorney, Agent, or Firm*—R. F. Beers; P. C. Lall; A. P. Durigon

[57] ABSTRACT

A plasma-spray technique using rapid temperature quenching transforms commercially available β-rhombohedral boron in powder form into thick, dense wafers of crystalline γ-tetragonal boron.

14 Claims, 4 Drawing Figures

METHOD FOR FORMING γ-BORON

BACKGROUND OF THE INVENTION

This invention is drawn to the field of materials science, and more particularly, to a novel method for forming γ-tetragonal boron.

Boron is a nonmetal and constitutes one of the elements of group IIIa of the periodic table. Among the growing commercial applications of the element is its use for case hardening various substrates such as beryllium when applied as a coating and as a strengthening agent in certain composite materials.

The known crystalline structures of boron include the α-rhombohedral, the β-rhombohedral and the γ-tetragonal forms. The α-rhombohedral phase of boron is known as the low-temperature form and can be produced by a variety of vapor-phase deposition techniques with substrate temperatures of from 800° to 1000° C. The β-rhombohedral form of boron is commercially available in powder or solid form and is typically prepared by processing at temperatures in excess of 1500° C. Reference in this connection may be had to an article entitled, "Structure and Polymorphism in Elemental Boron", incorporated herein by reference, by J. L. Hoard, appearing at pps. 42–52 in Advances in Chemical Series, No. 32, American Chemical Society, Washington, D.C., (1961).

It is known that γ boron can be formed by chemical vapor deposition of boron on a substrate maintained at about 1100°–1300° C. The vapor source typically is either hydrogen reduction of boron trichloride ($BCl_3$) or thermal decomposition of diborane ($B_2H_6$). Reference in this connection may be had to an article entitled, "The Structure of Tetragonal Borons", by Hoard et al, appearing at Vol. 80 of the J. Am. Chem. Soc., pp. 4507–15, (1958), incorporated herein by reference. However, the deposition rate obtained by the known methods is usually a few thousandths of a millimeter per hour which requires long deposition times to produce comparatively thin deposits. In addition, the known techniques of γ boron formation require relatively complex apparatus and the maintenance of high substrate temperatures.

SUMMARY OF THE INVENTION

The novel method of the present invention produces comparatively thick deposits of γ-tetragonal boron from β-rhombohedral boron utilizing a simple procedure characterized by a relatively short deposition time. The method of transforming β-rhombohedral boron in powder form into dense, substantially γ-tetragonal boron in solid form of the present invention comprises the steps of: obtaining β-rhombohedral boron in powder form; melting the β-rhombohedral boron in a plasma to form a directional high velocity jet of molten boron particles; directing the jet onto a substrate; rapidly cooling the molten particles at the substrate to form a deposit of dense, substantially γ-tetragonal boron in solid form; and removing the deposit from the substrate. The plasma is produced in a conventional arc-plasma gun by ionizing the gases argon and hydrogen by passing them through a high intensity DC electrical discharge. The substrate is a water-cooled rotating metallic disk, preferably copper, which cools the jet from the plasma temperature to a temperature on the order of room temperature in a short time. The rate of cooling is typically estimated at about $10^6$° C./second using this process. It has been found that in this manner comparatively thick and densified wafers on the order of $10^{-3}$ meters of the γ-tetragonal phase of boron is obtained from the β-rhombohedral phase of boron.

Accordingly, it is an object of the present invention to provide a method of transforming β-rhombohedral boron into γ-teragonal boron.

A more particular object is to transform β-rhombohedral boron in powder form into relatively dense and thick wafers of γ-tetragonal boron in solid form.

It is a related object to produce comparatively thick deposits of solid form γ-tetragonal boron from β-rhombohedral boron powder in a manner that involves a simple procedure and short deposition times.

Another object of the novel method of the present invention is to from γ-tetragonal boron by employing arc plasma spraying and rapid temperature quenching.

These and other objects, advantages and attendant features of the present invention will become apparent as the invention becomes better understood by reference to the following description of the preferred embodiment, and to the drawings, wherein:

DESCRIPTION OF A PREFERRED EMBODIMENT

Figure 1:
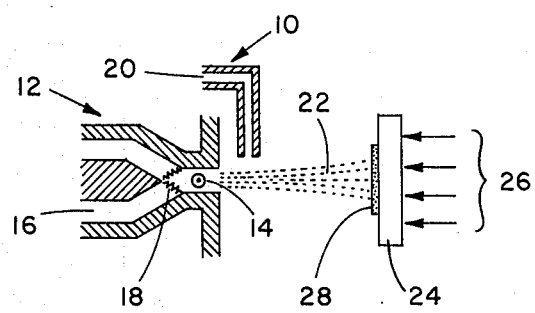
FIG. 1 is a schematic sketch of the plasma spraying and rapid temperature quenching process of the present invention.

Referring now to FIG. 1 generally designated at 10 is a schematic sketch of the plasma spraying process according to the present invention. A 40 kW Metco ® 3MB Plasma spray gun generally designated at 12 forms a plasma 14 by passing a selected gas such as a mixture of argon and hydrogen through gas input ports 16 through a high intensity DC electrical discharge designated at 18. The plasma 14 formed by the gun 12 is at a selected high temperature and comprises gas atoms, ionized gas atoms and electrons.

Commercially available 100 mesh crystalline β-boron powder of 99% purity is sifted through a 325 mesh screen. The fraction of powder that passes through the screen (almost 50%) is melted in the plasma 14 through a powder feed tube 20. The power input to the gun is selected so as to melt the β-boron powder. Typically, the temperature of the plasma is estimated to be on the order of 10,000° C.

Plasma 14 expands, due to its high heat and kinetic energy, and produces a high velocity directional jet 22 which includes molten β-rhombohedral boron. Jet 22 is deposited on a metallic substrate 24 where it is rapidly quenched by cooling water 26. Preferably, the substrate 24 is a rotating copper disk that has been mechanically grooved and grit blasted.

The rapid temperature quenching provided by the cooling water of the copper substrate 24 preferably is of the order of $10^6$° C./second. This quenching of the directional jet 22 from the plasma temperature to a temperature on the order of room temperature is accomplished in a time that is typically a fraction of a second. In this manner, it has been found that a thick and dense solid deposit 28 of the order of a millimeter in thickness of crystalline γ-tetragonal boron is formed on the substrate 24. The thickness of the deposit 28 is at least two (2) orders of magnitude greater than that obtained by conventional techniques and the deposit is formed in a time on the order of minutes compared to hours which would be required by former methods. Reference may be had to an article entitled "Equilibrium and Metastable Samarium-Cobalt Deposits Produced by Arc Plasma Spraying", incorporated herein by reference, the authors of which are the present applicants, appearing at Vol. 54 (1978) of "Thin Solid Films", at pps. 263-269, for a discussion and explanation of process parameters and the effect of their variation in the formation of amorphorous samarium-cobalt deposits by the plasma spraying technique.

Figure 2:
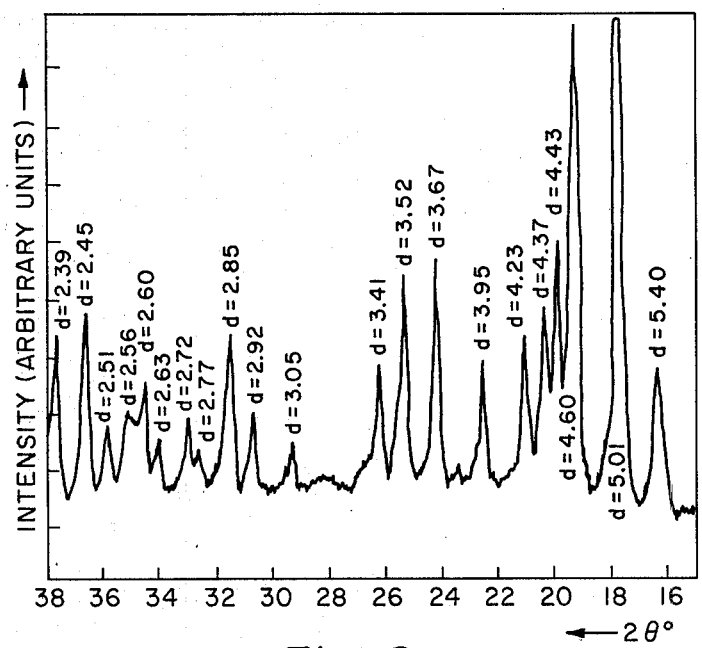
FIG. 2 is an X-ray pattern of β-rhombohedral boron in powder form.

FIG. 2 shows an X-ray diffractometer trace obtained using Cu radiation and a diffracted-beam graphite monochromator of the as-received powder which can be indexed quite easily from published data as that corresponding to β-rhombohedral boron. (See, in this connection, "An Analysis of Polymorphism in Boron Based Upon X-Ray Diffraction Results", Hoard et al, Vol. 82, J. Am. Chem. Soc., pp. 70-76 (1960), incorporated herein by reference.) After spraying, the deposit 28 was removed from the copper substrate, using an x-acto ® blade, and X-ray diffraction patterns were obtained from both sides of the deposit. This deposit was about 0.35 centimeters thick. The region of the deposit close to the copper showed traces of a copper-colored thin film which was mechanically polished off prior to obtaining the X-ray data. The opposite side of the deposit (that was facing the plasma spray gun) was also ground flat for the X-ray measurements.

Figure 3:
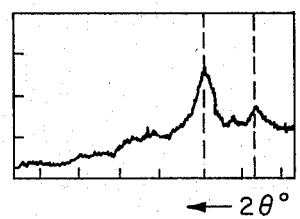
FIG. 3 is an X-ray pattern of the substrate side of a deposit formed by the plasma spraying process of the present invention.
Figure 4:
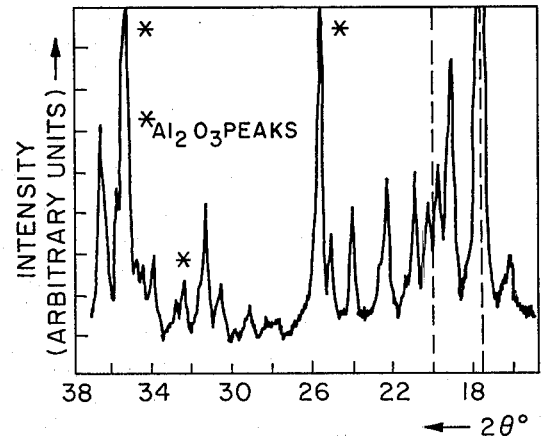
FIG. 4 is an X-ray pattern of the gun side of a deposit formed by the plasma spraying process of the present invention.

The patterns that were obtained on both sides of the deposit 28 are shown in FIG. 3 for the substrate side and in FIG. 4 for the gun side. Distinct differences are observed. Whereas the diffraction pattern obtained for the side closer to the gun clearly corresponds to that observed for the β-rhombohedral form, the pattern observed for the substrate side of the sample shows a considerable broadening of the peaks, in addition to the strongest peak at an interplanar spacing of 4.4 Å. In contrast, the strongest peak in the β-pattern (and the pattern obtained for the side facing the gun) is at about 5.0 Å.

This clearly shows that a different structure of boron has been produced by the novel method of the present invention. The crystal structure of the deposit that was obtained on the substrate side was tentatively identified as the γ-tetragonal phase of boron on the basis of the strong-peak intensity observed for d=4.4 Å. The transition of the deposit crystal structure from the γ-tetragonal type to the β-rhombohedral type with increasing deposit thickness (as can be inferred from the diffraction patterns shown in FIGS. 3 and 4), it is believed, is related to the heating up of the deposit with the buildup of thickness. Reference in this connection may be had to K. Kumar and D. Das, Vol. 54 (1978), "Thin Solid Films", pp. 263-269, incorporated herein by reference.

It is to be clearly understood that many modifications of the presently disclosed invention maybe effected without departing from the scope of the appended claims.

What is claimed is:

1. A method of transforming β-rhombohedral boron into dense, substantially γ-tetragonal boron, comprising the steps of:
    obtaining β-rhombohedral boron in powder form;
    melting the β-boron in a plasma to form a directional high velocity jet of molten boron particles;
    directing the jet onto a substrate;
    rapidly cooling the molten particles at the substrate to form a deposit of dense, substantially γ-tetragonal boron in solid form; and
    removing the deposit from the substrate.

2. A method of transforming β-rhombohedral boron into dense, substantially γ-tetragonal boron, as recited in claim 1, wherein said plasma is produced in an arc-plasma gun by passing argon and hydrogen through a high intensity DC electrical discharge.

3. A method of transforming β-rhombohedral boron into dense, substantially γ-tetragonal boron, as recited in claim 1, wherein said substrate is a water cooled rotating metallic disk which cools the molten particles in the jet from the plasma temperature to a temperature on the order of room temperature in a short time.

4. A method of transforming β-rhombohedral boron into dense, substantially γ-tetragonal boron, as recited in claim 3, wherein said short time is a small fraction of a second.

5. A method for forming γ-tetragonal boron, comprising the steps of:
    forming a stream of molten β-rhombohedral boron particles; and
    temperature quenching the stream of molten particles on a substrate to form a deposit of γ-tetragonal boron.

6. A method for forming γ-tetragonal boron, as recited in claim 5, wherein said stream of molten particles is formed by injecting β-boron powder in a preselected high temperature, high velocity plasma formed in an arc-plasma gun.

7. A method for forming γ-tetragonal boron, as recited in claim 6, wherein said temperature quenching step includes directing said stream of molten particles onto a rotating water-cooled metallic substrate.

8. A method that forms γ-tetragonal boron wafers of preselected thickness, comprising the steps of:
    obtaining β-rhombohedral boron in powder form;
    heating the β-boron powder in a plasma having a preselected temperature to produce molten β-boron particles;
    directing the molten β-boron particles/plasma in a stream onto a substrate;
    maintaining the molten β-boron particles/plasma stream in contact with the substrate for a preselected time;
    cooling the substrate such that the molten β-boron particles/plasma stream is quenched from the temperature of the plasma to a low temperature at a rapid rate to form γ-tetragonal boron wafers.

9. A method that forms γ-tetragonal boron wafers of preselected thickness, as recited in claim 8, wherein said rapid cooling rate is on the order of $10^6$°C. per second.

10. A method that forms γ-tetragonal boron wafers of preselected thickness, as recited in claim 8, wherein said heating step includes using an arc-plasma gun.

11. A method that forms γ-tetragonal boron wafers, as recited in claim 10, wherein said preselected plasma temperature is estimated at approximately 10,000° C.

12. A method that forms γ-tetragonal boron wafers, as recited in claim 8, wherein said low temperature is approximately room temperature.

13. A method that forms γ-tetragonal boron wafers, as recited in claim 12, wherein said substrate is a rotating metallic disk, and wherein said cooling step includes applying a coolant to said metallic disk.

14. A method that forms γ-tetragonal born wafers, as recited in claim 13, wherein said coolant is water.

* * * * *